(12) United States Patent
Kawauchi et al.

(10) Patent No.: US 7,233,846 B2
(45) Date of Patent: Jun. 19, 2007

(54) TROUBLE DIAGNOSING DEVICE

(75) Inventors: Hiroshi Kawauchi, Tokyo (JP); Akihisa Kitajima, Tokyo (JP); Shuichi Komatsu, Tokyo (JP); Tomonari Miura, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 357 days.

(21) Appl. No.: 10/911,222

(22) Filed: Aug. 4, 2004

(65) Prior Publication Data

US 2005/0065680 A1   Mar. 24, 2005

(30) Foreign Application Priority Data

Aug. 8, 2003   (JP) ............................. 2003-290198

(51) Int. Cl.
*G01M 17/04*   (2006.01)
*B60R 16/02*   (2006.01)
*G06F 17/00*   (2006.01)

(52) U.S. Cl. ............................. 701/29; 701/33; 701/37; 73/11.04

(58) Field of Classification Search ............ 701/29–35, 701/37, 38; 73/11.04, 11.08; 280/5.514
See application file for complete search history.

(56) References Cited

U.S. PATENT DOCUMENTS

| | | | | |
|---|---|---|---|---|
| 5,648,902 A * | 7/1997 | Honda | ........................ | 701/29 |
| 5,774,361 A * | 6/1998 | Colarell et al. | ............... | 701/29 |
| 5,909,379 A * | 6/1999 | Dale et al. | ...................... | 703/8 |
| 5,968,108 A | 10/1999 | Takakura et al. | | |
| 6,141,608 A | 10/2000 | Rother | | |
| 6,181,992 B1 * | 1/2001 | Gurne et al. | ................... | 701/29 |
| 6,327,525 B1 * | 12/2001 | Pauli et al. | .................... | 701/29 |
| 6,370,455 B1 * | 4/2002 | Larson et al. | ................. | 701/33 |
| 6,411,874 B2 * | 6/2002 | Morgan et al. | ............... | 701/36 |
| 6,542,794 B2 | 4/2003 | Obradovich | | |
| 6,615,120 B1 | 9/2003 | Rother | | |
| 6,845,307 B2 | 1/2005 | Rother | | |
| 2001/0029410 A1 | 10/2001 | Obradovich | | |
| 2003/0187556 A1 * | 10/2003 | Suzuki | ........................ | 701/29 |
| 2005/0065679 A1 | 3/2005 | Kawauchi et al. | | |
| 2005/0137762 A1 | 6/2005 | Rother | | |

FOREIGN PATENT DOCUMENTS

DE   197 12 924 A1   10/1997

(Continued)

OTHER PUBLICATIONS

Relevant portion of Chinese Office Action in corresponding Chinese Application 200410056522.X of related co-pending U.S. Appl. No. 10/911,066.

(Continued)

*Primary Examiner*—Tan Q. Nguyen
(74) *Attorney, Agent, or Firm*—Rossi, Kimms & McDowell LLP

(57) ABSTRACT

An enlargement button that instruct enlargement of first to fourth buttons to is displayed on a display. The first to fourth buttons to are used to instruct the operation of a control device to be controlled by an electronic control unit to which a trouble diagnosing device is connected. When the enlargement button is manipulated, the first to fourth buttons to are enlarged in the display respectively in corners sections created by dividing the display screen substantially equally into four. With this arrangement, the operator no longer needs to monitor the first to the fourth button by eyes for manipulating these buttons, thereby improving the operability.

10 Claims, 7 Drawing Sheets

FOREIGN PATENT DOCUMENTS

| | | |
|---|---|---|
| EP | 0 922 952 A1 | 6/1999 |
| JP | 2000-240495 A | 9/2000 |
| JP | 2002-91545 A | 3/2002 |
| JP | 2002-091545 A | 3/2002 |
| KR | 2000-0028587 A | 5/2000 |
| KR | 2000-0059333 | 10/2000 |
| WO | WO 00/39556 A1 | 7/2000 |

OTHER PUBLICATIONS

"Notification For Filing Opinion" for Korean Patent Application 10-2004-61873. Mailing date: Jan. 2, 2006.

"Notification For Filing Opinion" for Korean Patent Application 10-2004-61897. Mailing date: Jan. 6, 2006.

Rupalla et al.; "Innovative Diagnostics Applications in the Vehicle"; Automotive Electronics; Nov. 2002; pp. 82-87.

German Office Action for German Patent Application 10 2004 038 348.0-52; mailing date, Oct. 12, 2005; English translation of Official Action dated Oct. 12, 2005.

German Office Action for related German Patent Application 10 2004 038 376.6-52; mailing date, Oct. 13, 2005; English translation of Official Action dated Oct. 13, 2005.

* cited by examiner

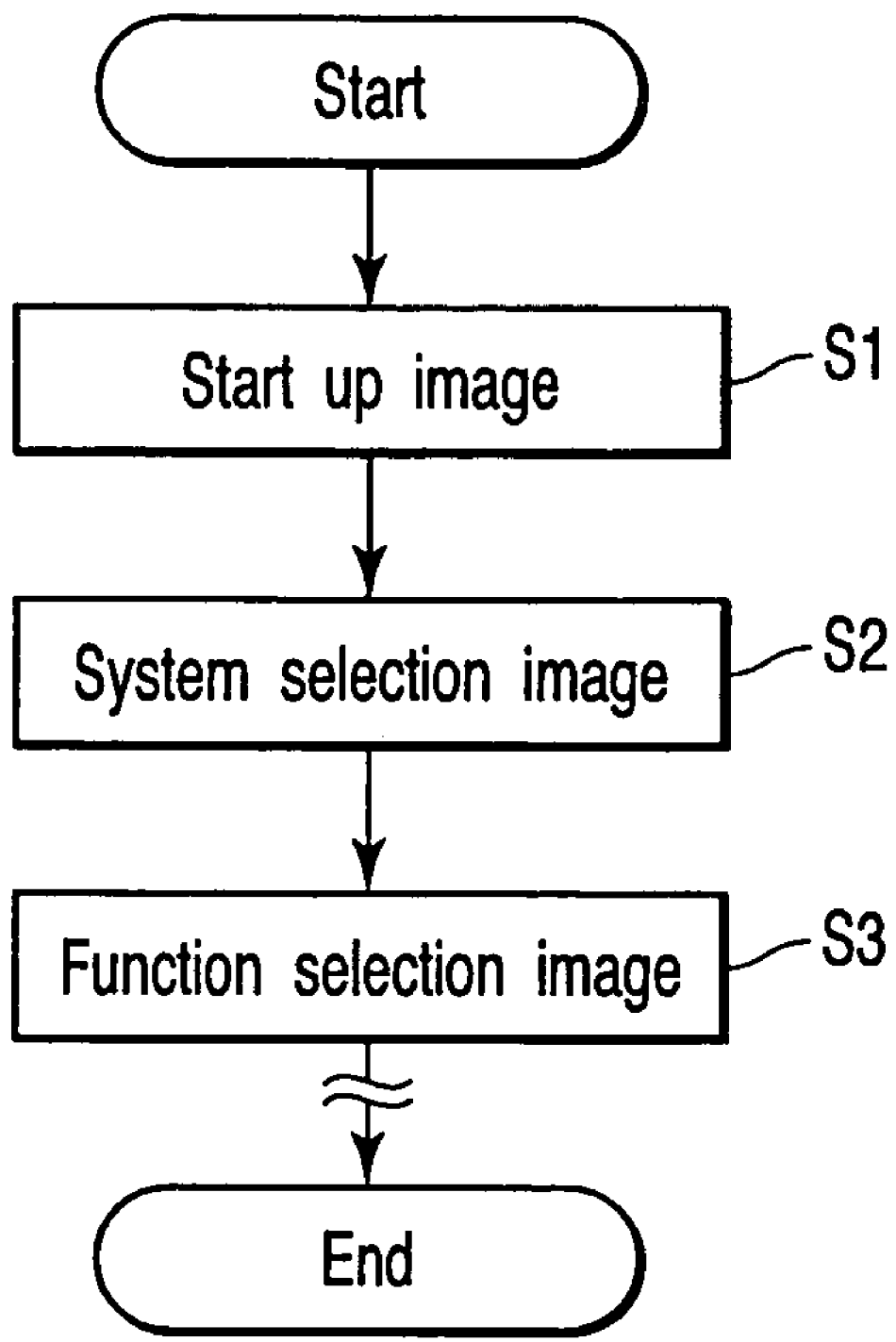
F I G. 5

TROUBLE DIAGNOSING DEVICE

CROSS-REFERENCE TO RELATED APPLICATIONS

This application is based upon and claims the benefit of priority from prior Japanese Patent Application No. 2003-290198, filed Aug. 8, 2003, the entire contents of which are incorporated herein by reference.

BACKGROUND OF THE INVENTION

1. Field of the Invention

The present invention relates to a trouble diagnosing device that diagnoses a trouble of a vehicle such as a track or a bus, as the device is coupled with an ECU (electronic control unit) mounted on the vehicle.

2. Description of the Related Art

As shown in FIG. 10, a trouble diagnosing device for an electronic control system of a vehicle is conventionally known. (See, for example, Jpn. Pat. Appln. KOKAI Publication No. 2002-91545) As shown in FIG. 10, a trouble diagnosing device 1 is connected via a communication line 2 to a vehicle-installed ECU 3 (electronic control unit). Various commands are transmitted and received between the trouble diagnosing device 1 and the ECU 3 via the communication line 2. For example, in the case where a vehicle equipped with the ECU 3 is of an air suspension type, a memory 4 for storing vehicle height data and air suspension pressure data is connected to the ECU 3. Further, an actuator (not shown) for opening/closing a valve that controls the charge and discharge of air to and from the air suspension is connected to the ECU 3.

The trouble diagnosis device 1 includes a display unit 5, an "S" key 6a, a "C" key 6b, a cursor key 7, an "YES" key 8a, a "NO" key 8b and function keys 9.

When a vehicle height adjustment mode is set in the trouble diagnosis device 1, an image for adjusting a front-side vehicle height is displayed on the display unit 5 as can be seen in FIG. 11A. The lowermost section of the display unit 5 displays an "UP" display portion, which indicates that the operation is set to a mode of raising the vehicle height, a "DOWN" display portion, which indicates that the operation is set to a mode of lowering the vehicle height, and a "FIX" display portion, which indicates that the operation is set to a mode of assigning the adjusted value as an initial value to the memory 4. The currently set mode is indicated by color reversion in black and white. That is, FIG. 11A shows a case where the mode of raising the vehicle height is set.

As a vehicle height adjusting mode, there is a neutral position setting mode for setting the vehicle height at a neutral position. In the neutral position setting mode, an operator keeps on pushing a particular key, for example, the "YES" key 8a, while measuring the vehicle height using a gauge, to transmit the command of raising the vehicle height to the ECU 3, and thus the vehicle is raised. When the vehicle height reaches the neutral position, the "YES" key 8a is released to stop the vehicle raising operation.

However, there is, for example, a time delay in the operation of the valve that controls charging and discharging of air to and from the air suspension, and therefore the supply of the air is not stopped immediately after releasing the "YES" key 8a. As a result, the front-side vehicle height, in some cases, becomes higher than the neutral position.

In these cases, the cursor key 7 is operated to revert the color of the "DOWN" display portion from black to white, and then the "YES" key 8a is pushed. In this manner, the vehicle height lowering operation is performed to adjust the height to the neutral position.

As described above, in the adjustment of the vehicle height, the raising and lowering of the height must be repeated, and the cursor key 7 must be manipulated each time to change the direction of the vehicle height adjustment. Thus, the operability is not good.

Further, since the vehicle height is adjusted while pressing the "YES" key 8a, an overshoot, which causes a vehicle height higher or lower than the neutral position, occurs in some cases for the following reason. That is, when the vehicle height reaches near the neutral position in an actual situation, the charge or discharge of air to or from the air suspension cannot be performed appropriately due to a time delay in the operation of the valve, causing the overshoot.

Moreover, as shown in FIG. 11B, a key must be manipulated in order to display the pressure data of the air suspension, resulting in a poor operability.

BRIEF SUMMARY OF THE INVENTION

The present invention has been proposed in consideration of the above-described points, and the object thereof is to provide a trouble diagnosing device that can improve the operability in the adjustment of the vehicle height for an air suspension-equipped type vehicle.

According to an aspect of the present invention, there is provided a trouble diagnosing device connectable to an electronic control unit mounted on a vehicle, the trouble diagnosing device comprising: a display unit including a rectangular display screen; a plurality of manipulation instruction units displayed on the display unit and configured to instruct operation of a control device controlled by the electronic control unit, and a display enlargement instruction unit displayed on the display unit and configured to instruct enlargement of display of the plurality of manipulation instruction units, wherein when the display enlargement instruction unit is manipulated, the display of each of the plurality of manipulation instruction units is enlarged along corners of the display unit.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart briefly illustrating the operation of the trouble diagnosing device according to the same embodiment;

DETAILED DESCRIPTION OF THE INVENTION

Figure 1:
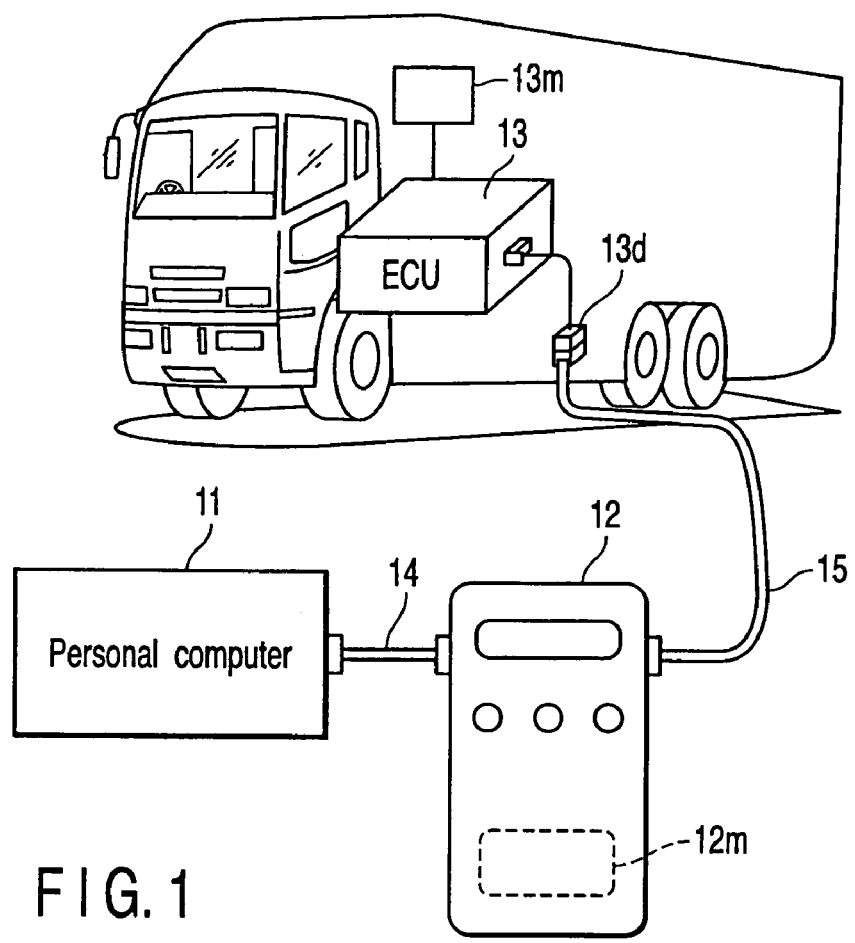
FIG. 1 is a diagram illustrating connection between a trouble diagnosing device and an ECU according to an embodiment of the present invention.

An embodiment of the present invention will now be described with reference to accompanying drawings. FIG. 1 is a diagram illustrating connection between the trouble diagnosing device according to this embodiment and an ECU mounted to the vehicle and designed to control the air suspension. This figure also shows a personal computer (to be abbreviated as PC hereinafter) 11 that constitutes the trouble diagnosing device. The PC 11 is connected to the ECU 13 mounted on the vehicle and serving as an electronic control device, via a VCI (vehicle communication interface) 12 serving as an interface equipment. The ECU 13 controls an air suspension device as a control device, which will be explained later.

The PC 11 and VC 112 are connected to each other via a multiple communication line 14, and the VCI 12 and ECU 13 are connected to each other via a multiple communication line 15. An end of the multiple communication line 15 is coupled to a diagnosis connector 13d of the ECU 13.

The VCI 12 has a function of converting a communication specification used for the ECU 13 into a communication specification used for the PC 11. The VCI 12 has a built-in microprocessor and has a memory 12m inside.

Figure 2:
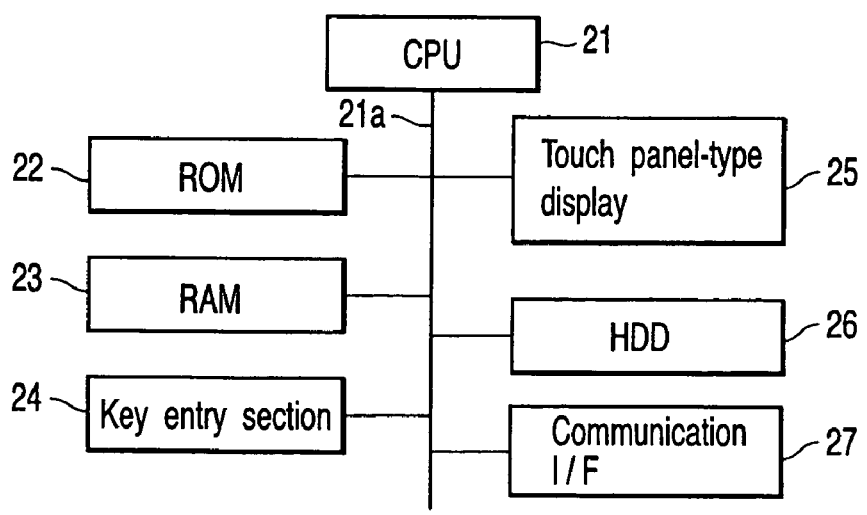
FIG. 2 is a diagram showing a system structure of a personal computer that constitutes the trouble diagnosing device according to the same embodiment.

The ECU 13 has a diagnostic function. The diagnostic function means a self-diagnostic function. That is, the ECU 13 monitors input signals from various types of sensors, an actuator and switch, and when some abnormality occurs in anyone of the input signals, the ECU 3 stores the contents of the abnormality (diagnosis code) or the data at the time the abnormality occurred in the memory 13m as maintenance and repair data. The structure of the PC 11 will now be described with reference to FIG. 2. FIG. 2 shows a CPU (central processing unit) 21. To the CPU 21, a ROM (read-only memory) 22, a RAM (random access memory) 23, a key entry portion 24, a touch-panel type display 25 having a rectangular display screen, an HDD (hard disk device) 26, a communication I/F 27 and a printer I/F 28 are connected via a system bus 21a. The HDD 26 stores a trouble diagnostic program for executing the diagnostic functions. The trouble diagnostic program includes a main program as illustrated in FIG. 5, and a program for displaying an image corresponding to a touch button displayed on the display 25 when an operator touches the button, a program for executing a process designated by the button, and the like. It should be noted here that the RAM 23 has various work areas.

Next, the air suspension of a truck having four rear wheels in total, two in each side, will now be described with reference to FIGS. 3 and 4.

Figure 3:
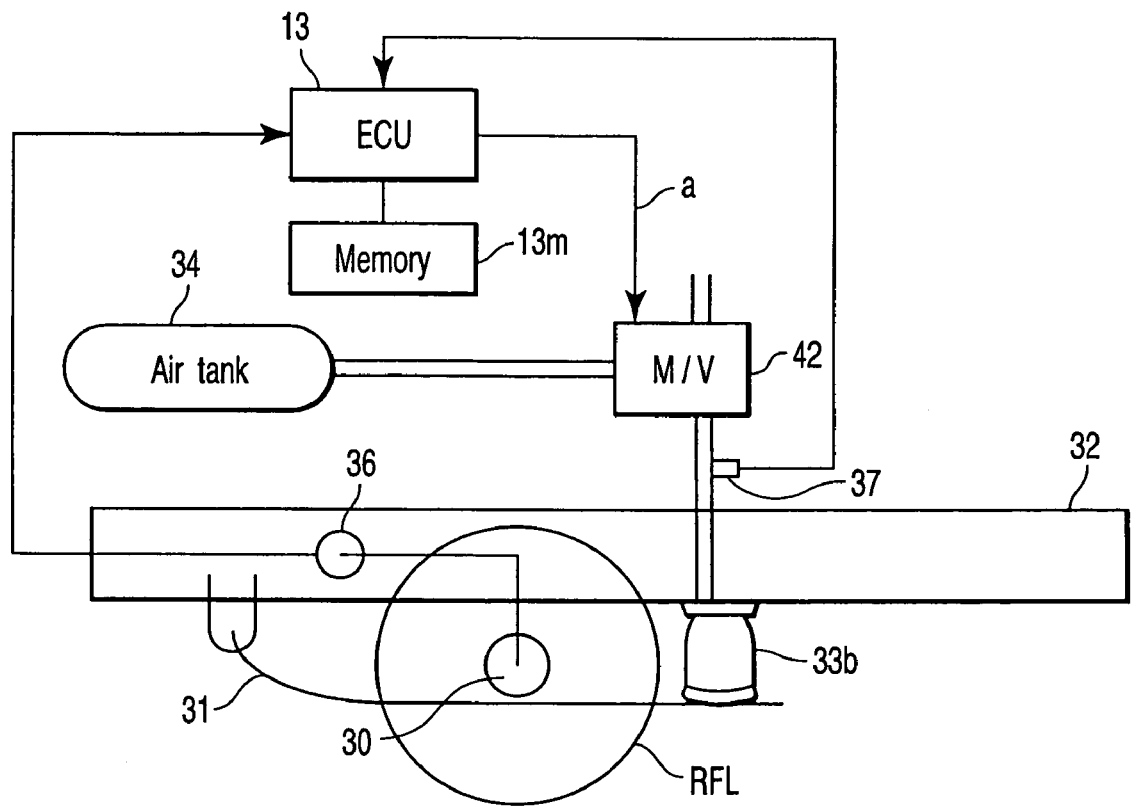
FIG. 3 is a schematic diagram showing a main part of an air-suspension type vehicle according to the same embodiment, designed to illustrate the adjustment of the vehicle height.

FIG. 3 is a schematic diagram briefly showing the structure around the rear front-left wheel (RFL) of the four rear wheels. It should be noted that in this truck, the front two wheels and the rear four wheels are equipped with air suspensions 33a and 33b, respectively, as shown in FIG. 4.

The air suspension 33b is intercalated between a plate sprint 31 on which an axle shaft 30 of the rear front-left wheel RFL, and a frame 32. The other wheels are each equipped with an air suspension 33a or 33b. Thus, the vehicle height can be adjusted by controlling the amount of air supplied to each of the air suspensions 33a and 33b. It should be noted here that an end of the plate spring 31 is rotatably mounted to the frame 32.

A magnet valve (M/V) 42 is intercalated between an air tank 34 and the air suspension 33b. The state of the magnet valve (M/V) 42 is switched by an actuator (not shown) among a position where the air tank 34 and the air suspension 33b are coupled together, a position where the air suspension 33b is open to the atmosphere, and a shut-down position. The actuator is operated in accordance with a control signal a supplied from the ECU 13. An RL height sensor 36 serves to check the vehicle height for the left side of the rear from axle shaft 30.

On the other hand, a pressure sensor 37 serves to check the pressure of the air suspension 33b provided for the rear front-left wheel RFL (that is, RFL SPG pressure value). The pressure value detected by the pressure sensor 37 is stored as a SPG (spring) value in the memory 13m.

Similarly, the vehicle height at the front wheels is checked with an F height sensor, which is not shown, and the vehicle height at the rear front-right wheel is checked with an RR height sensor, which is not shown. The vehicle heights at the front wheels, the rear front-left wheel and the rear front-right wheel checked by the F height sensor, RL height sensor 36 and RR height sensor, respectively, are stored in predetermined areas of the memory 13m.

Further, the pressure of the air suspension 33b for the rear front-right wheel (RFR), (that is, RFR SPG pressure value), the pressure of the air suspension 33b for the rear front-left wheel (RFL), (that is, RFL SPG pressure value), and the pressure of the air suspension 33b for the rear rear-right wheel (RRR), (that is, RRR SPG pressure value) are checked by respective pressure sensors, which are not shown in the figure. The RFR SPG pressure value, RFL SPG pressure value, and RRR SPG pressure value are stored in predetermined areas of the memory 13m.

Figure 4:
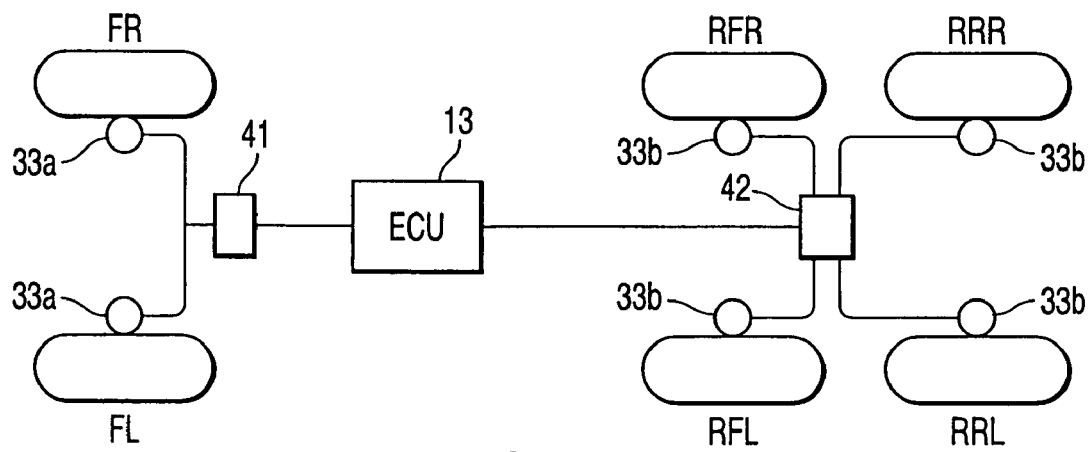
FIG. 4 is a diagram illustrating air piping in the air-suspension type vehicle according to the same embodiment.

FIG. 4 is a diagram showing the air piping of the truck shown in FIG. 1. The front left wheel FL, front right wheel FR, rear front-left wheel RFL, rear front-right wheel RFR, rear rear-left wheel RRL, and rear rear-right wheel RRR are each equipped with the respective one of the air suspensions 33a and 33b. The charge and discharge of air with respect to the air suspensions 33a for the front left wheel FL and front right wheel FR are controlled by a magnet valve 41. Further, the charge and discharge of air with respect to the air suspensions 33b for the rear front-left wheel RFL, rear front-right wheel RFR, rear rear-left wheel RRL, and rear rear-right wheel RRR are controlled by a magnet valve 42. It should be noted here that there are two modes for adjusting the vehicle height at the rear wheels. In the normal mode, air is charged and discharged with respect to the air suspensions 33b for the rear front-left wheel RFL, rear front-right wheel RFR, rear rear-left wheel RRL, and rear rear-right wheel RRR all at the same time. In the other mode, air is charged and discharged with respect to each of the air suspensions 33b for the rear front-left wheel RFL, rear front-right wheel RFR, rear rear-left wheel RRL, and rear rear-right wheel RRR independently.

Next, the operation will now be described. First, the members are connected to each other as shown in FIG. 1. Then, the PC 11 is turned on to start up the trouble diagnosing program, and then the starter switch (not shown) of the truck is turned on, the trouble diagnosis illustrated by the flowchart shown in FIG. 5 is started.

Figure 6:
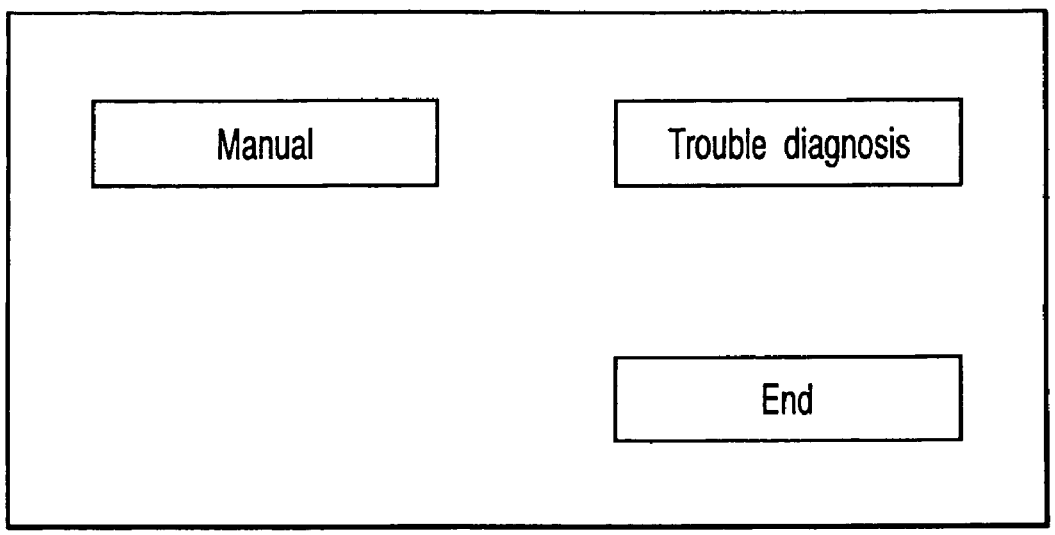
FIG. 6 is a diagram showing a startup screen of the trouble diagnosing device according to the same embodiment.
Figure 7:
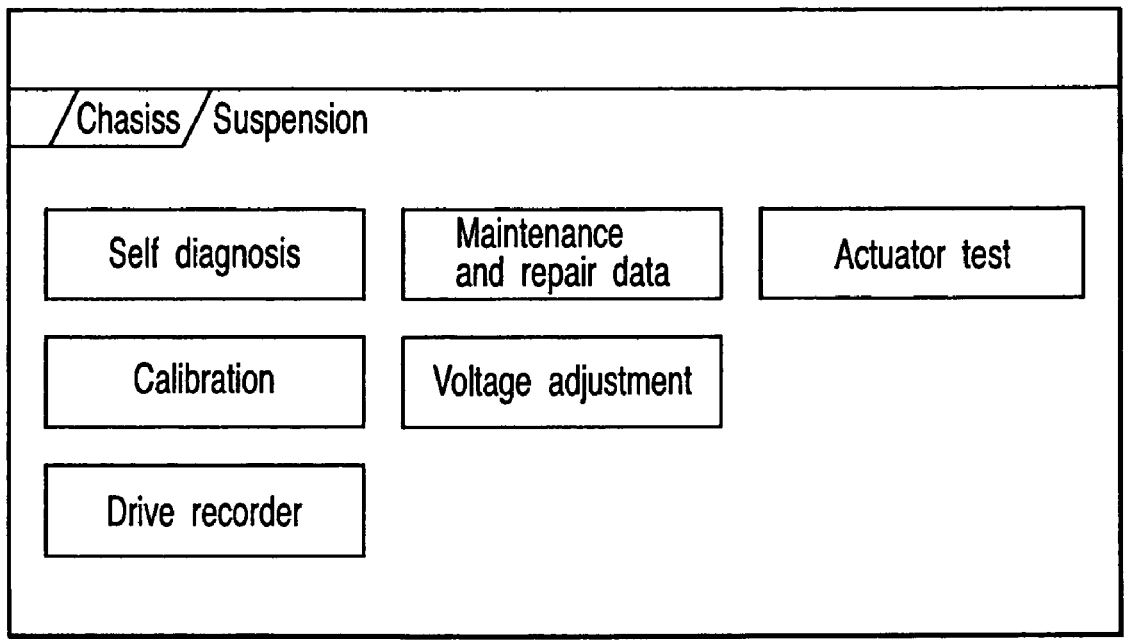
FIG. 7 is a diagram showing a function selection image of the trouble diagnosing device according to the same embodiment.

First, a startup image as shown in FIG. 6 is displayed as the main menu on the display 25 (Step S1). Next, when the "trouble diagnosis" button is selected, then a system selection image is displayed on the display 25, in which one of the three systems, namely, engine, chassis and body can be selected (Step S2). Next, when the chassis is selected from this image and then the air suspension is selected, the function selection image as shown in FIG. 7 is displayed (Step S3).

This function selection image presents a plurality of buttons for the "self-diagnosis", "calibration", etc.

Figure 8:
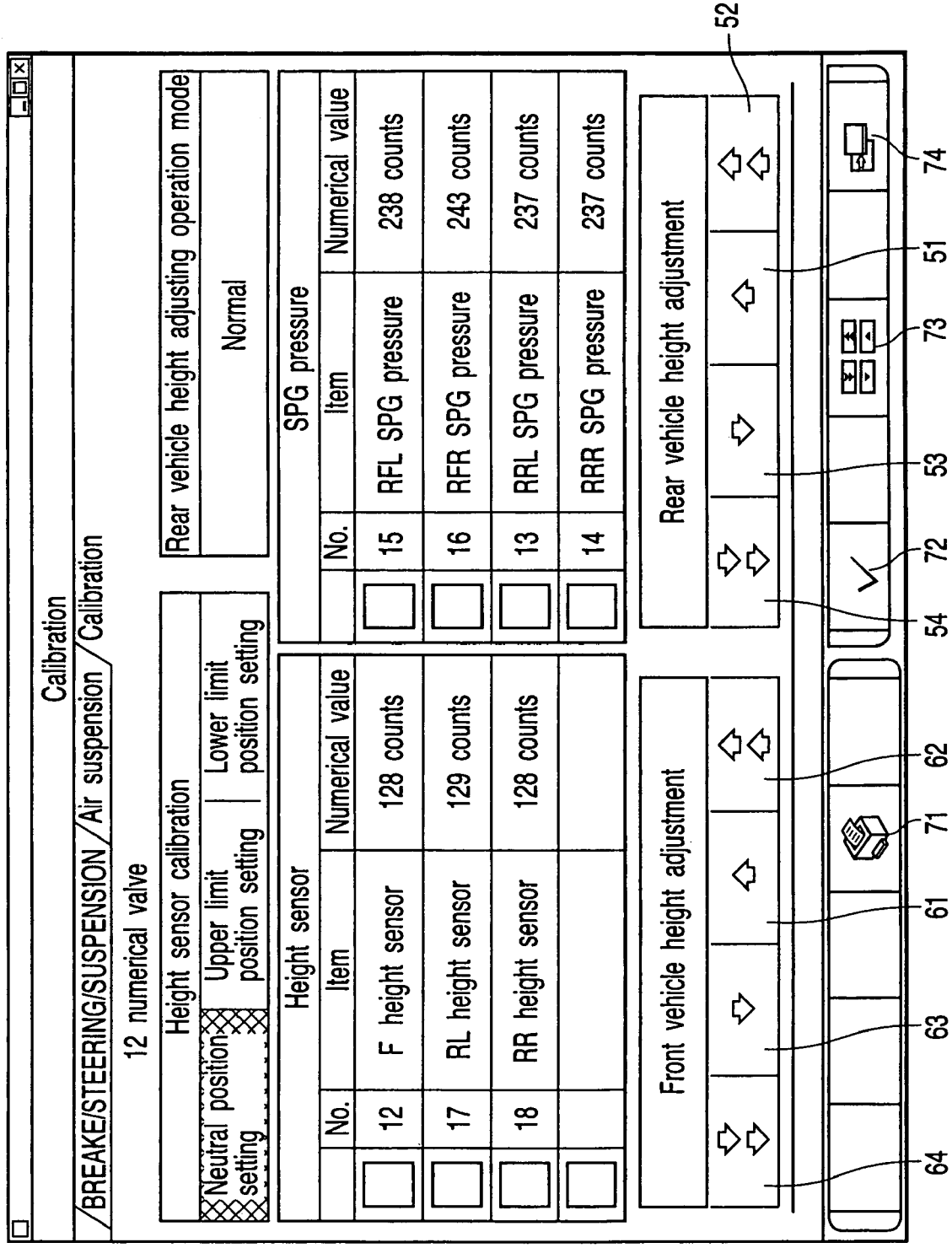
FIG. 8 is a diagram showing a calibration image of the trouble diagnosing device according to the same embodiment.

When the "calibration" is selected from this image, a calibration image as shown in FIG. 8 is displayed on the display 25. Here, the calibration means the initial settings. The ordinary air suspension calibration is carried out in the following order: the setting of the neutral position for the vehicle height at each of the front and rear sides, the setting of the upper limit position for the vehicle height at each of the front and rear sides, and the setting of the lower limit position for the vehicle height at each of the front and rear sides. This order is fixed.

The image shown in FIG. 8 is the one displayed when setting the neutral position for the vehicle height at each of the front and rear sides.

The display image shown in FIG. 8 will now be described in more detail. The "neutral position setting", "upper limit position setting" and "lower limit position setting" are displayed in the column of the height sensor calibration displayed in the upper left section of the screen image, and the currently selected mode is indicated by shading the display. In this example, the "neutral position setting" is presently selected, and therefore the indication of the "neutral position setting" is shaded.

The upper right section of the screen image indicates a selected mode as the "rear vehicle height adjusting operation mode". The middle left section of the screen image displays numerical values of the three height sensors (F height sensor, RL height sensor and RR height sensor). These numerical values each indicate a vehicle height.

The middle right section of the screen image displays numerical values of the SPG pressures detected by the four pressure sensors (RFL SPG pressure value, RFR SPG pressure value, RRF SPG pressure value and RRR SPG pressure value). These numerical values each indicate a pressure of the respective one of the air suspensions 33b.

Below the region displaying the "rear vehicle height adjustment" in the lower right section of the display image, first to fourth buttons 51 to 54 are displayed as operation instructing means. For the sake of expediency, the first and third buttons are called fine adjustment buttons. The first button 51 is used for fine adjustment, and while the button is being pressed, a command of supplying air to the respective suspension 33b for a predetermined time (for example, 75 msec) is output to the ECU 13, and thus the rear vehicle height is raised by fine adjustment. The second button 52 is a continuous operation button, and while the button is being pressed, a command of supplying air to the rear side suspensions 33b is transmitted to the ECU 13. In this manner, the rear vehicle height is raised until the second button 52 is released from being pressed. Thus, the vehicle height can be raised at a higher rate than that of the adjustment by the first button 51.

On the other hand, the third button 53 is used for fine adjustment, and while this button is being pressed, a command of discharging air from the respective suspension 33b for a predetermined time (for example, 75 msec) is output to the ECU 13, and thus the rear vehicle height is lowered by fine adjustment. The fourth button 54 is a continuous operation button, and while the button is being pressed, a command of discharging air from the rear side suspensions 33b is transmitted to the ECU 13. In this manner, the rear vehicle height is lowered until the fourth button 54 is released from being pressed. Thus, the vehicle height can be lowered at a higher rate than that of the adjustment by the third button 53.

With use of the first and third buttons 51 and 53 for fine adjustment, the vehicle height can be finely adjusted and it can be adjusted to a target value quickly, thus making it possible to improve the operability.

Below the region displaying the "front vehicle height adjustment" in the lower left section of the display image, first to fourth buttons 61 to 64, which are used to adjust the vehicle height on the front side, are displayed. The first to fourth buttons 61 to 64 are the same as those of the first to fourth buttons 51 to 54 described above in terms of functions, and therefore the detailed explanations for these buttons will be omitted here. It should be noted that for a vehicle with air suspensions 33b equipped only for the rear side, the first to fourth buttons 61 to 64 may be omitted.

As described above, for the front vehicle height adjustment as well, the first and third buttons 61 and 63, which are used for fine adjustment, can be manipulated to finely adjust the front vehicle height and adjust it to a target value quickly, thereby making it possible to improve the operability.

Thus, the buttons 61 to 64 used for the adjustment of the vehicle height on the front side and the buttons 51 to 54 used for the adjustment of the vehicle height on the rear side are all displayed on the same image, and therefore the vehicle heights on the front and rear sides can be adjusted without having to switch the display image. Therefore, the operability can be improved.

Menu bars displayed in the lowermost part of the image include a print button 71 used to print out an image that is presently displayed, a determination button 72 used to determine a process, an enlargement button 73 serving as display enlargement instructing means for enlarging the display of each of the first to fourth buttons 51 to 54 or the first to fourth buttons 61 to 64, and an operation mode switch button 74 used to switch the operation mode. When the determination button 72 is manipulated, the vehicle height data detected by the height sensor is stored in the memory 13m. Since the determination button 72 is displayed on the same screen image as that of the first to fourth buttons 51 to 54 used to adjust the vehicle height on the rear side and the first to fourth buttons 61 to 64 used to adjust the vehicle height on the front side, the determination button 72 can be manipulated without switching the display image. Therefore, the operability can be improved.

When the operation mode switch button 74 is manipulated, the rear vehicle height adjustment mode displayed in the upper right section of the screen image is switched from the "normal mode", by which the vehicle heights at all of the suspension 33b for the rear side are adjusted at the same time, to a mode for controlling the air suspensions 33b on the rear side independently.

Next, how the calibration process is carried out while the calibration image shown in FIG. 8 is displayed on the display 25 will now be described. The operator manipulate the first to fourth buttons 51 to 54 to adjust the vehicle height on the rear side to a predetermined neutral position while obtaining measuring by applying a measure on the vehicle body.

Figure 9:
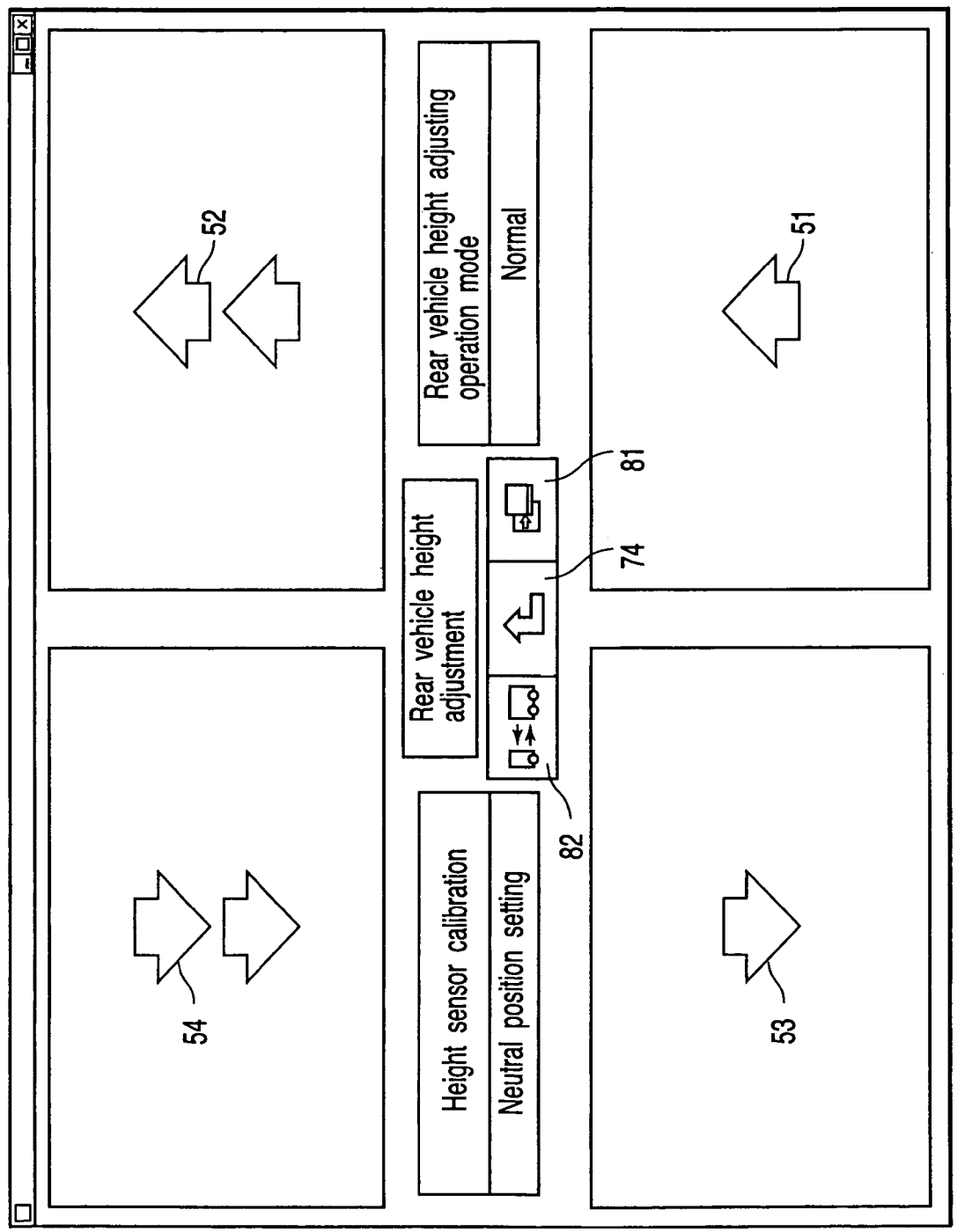
FIG. 9 is a diagram illustrating an enlarged display of each of buttons 51 to 54 shown in the image of FIG. 8.
Figure 10:
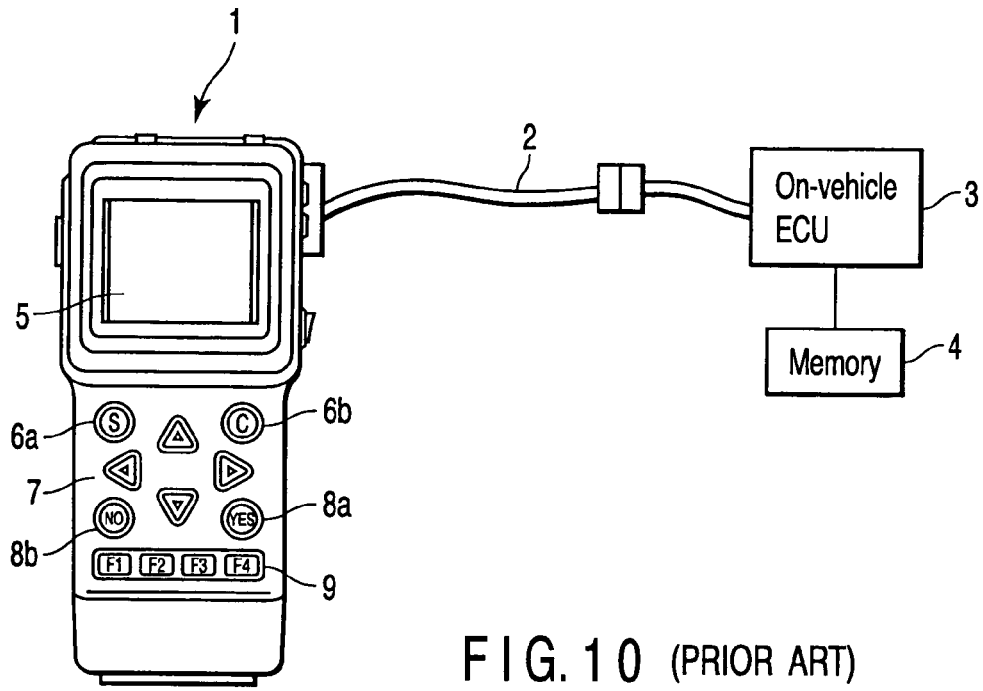
FIG. 10 is a diagram illustrating a trouble diagnosing device according to a conventional technique.
Figure 11A:
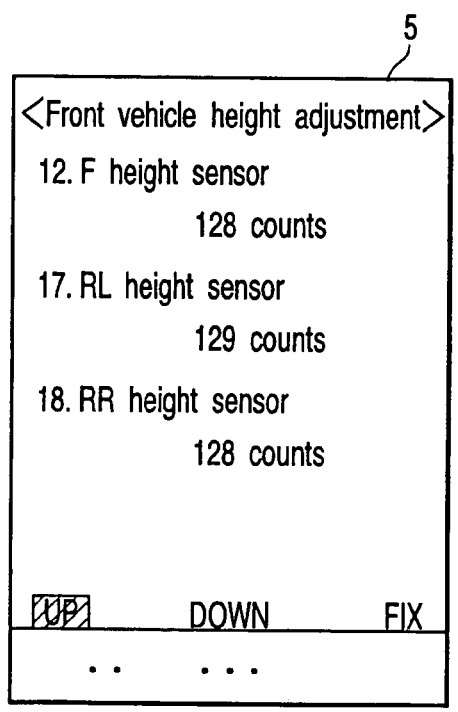
FIGS. 11A and 11B are diagrams each showing a display image of the trouble storing unit according to the conventional technique.
Figure 11B:
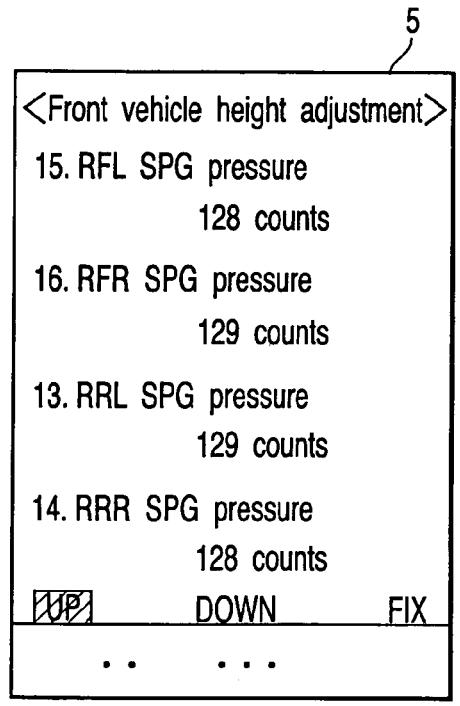

During this period, the enlargement button 73 is manipulated. When the enlargement button 73 is manipulated, the first to fourth buttons 51 to 54 are displayed on the display 25 in such a manner that the enlarged buttons are displayed near the respective corners in sections prepared by dividing the rectangular display screen substantially equally into four as shown in FIG. 9. It should be noted that the middle left section of the display screen shown in FIG. 9 indicates that the "neutral position setting" of the "height sensor calibration" is presently carried out. Further, the middle right section of the display screen shown in FIG. 9 indicates that the "rear vehicle height adjustment operation mode" is the "normal mode". Further, the central section of the display screen shown in FIG. 9 displays a "return" button 81 used to return from the enlarged display such as shown in FIG. 9 to the display shown in FIG. 8, the aforementioned operation mode switch button 74 and a selection button 82 used to select which of the front and rear suspensions is to be adjusted. Above the "return" button 81, the operation mode switch button 74 and the selection button 82, the "rear vehicle height adjustment", which indicates that the first to fourth buttons 51 to 54 are designed for the vehicle adjustment on the rear side, is displayed. When the selection button 82 is manipulated while in the above-described state, the "front vehicle height adjustment" is displayed, and the "rear vehicle height adjustment" is not displayed.

In the "rear vehicle height adjustment", the enlargement button 73 is manipulated to enlarge the display of the first to fourth buttons 51 to 54 in such a manner that the buttons are displayed near the respective corners in sections prepared by dividing the rectangular display screen substantially equally into four as shown in FIG. 9. With this arrangement, the operator is able to manipulate the first to fourth buttons 51 to 54 by touching the enclosure of the display 25 by fingers to know the locations of the first to fourth buttons 51 to 54 without monitoring the display image by eyes. Therefore, the ease of the maintenance and repair can be improved.

As described above, while displaying the enlarged image on the display 25 as shown in FIG. 9, the calibration process is carried out to set the vehicle height on the rear side to the neutral position, and then the "return" button 81 is manipulated to return the enlarged image to that shown in FIG. 8. After that, when the determination button 72 is manipulated, the rear vehicle height as the neutral position is stored in the memory 13m.

Here, when the determination button 72 is manipulated, the mode is automatically shifted to the setting of the vehicle height to the upper limit position and then to the setting it to the lower limit position, consecutively. Thus, the setting of the upper limit position and the setting of the lower limit position setting are carried out in the order, and the calibration of the height sensor is finished.

It should be noted that it is alternatively possible in the above-described embodiment that the determination button 72 is provided at the central section of the display image in the enlarged display image shown in FIG. 9. With the determination button 72 provided on the enlarged display image, the determination process can be executed on the display image shown in FIG. 9, thereby improving the operability.

Further, when the determination process is executed, it is alternatively possible to automatically check that the vehicle height is in a specified range, and execute the determination process only if the vehicle height is normal. In this alternate version, when the checked vehicle height is not normal, the indication of the abnormality may be displayed and the determination process may be withheld until the problem is cleared.

It should be noted that the above embodiment was described in connection with the case of the trouble diagnosing device connected to the ECU 13 serving as the electronic control device used for controlling the air suspension devices; however the present invention is not limited to this embodiment, but it can be applied to some other electronic controlling unit for controlling devices other than the air suspension devices. For such a controlling unit, the operability can be improved by enlarging the buttons on the display.

It should be further noted that in the above-described embodiment, the trouble diagnosing program is stored in the HDD 26; however the present invention is not limited to this, but it is alternatively possible to store the program in an external storage means such as a CD-ROM or FD, and download them to the HDD 26 of the PC 11 as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A trouble diagnosing device connectable to an electronic control unit mounted on a vehicle, the trouble diagnosing device comprising:
    a touch-panel display unit including a rectangular display screen having four corners;
    a plurality of manipulation instruction units including four buttons displayed on the display unit and configured to instruct operation of a control device controlled by the electronic control unit; and
    a display enlargement instruction unit displayed on the display unit and configured to instruct enlargement of display of the four buttons,
    wherein when the display enlargement instruction unit is manipulated, the four buttons of the plurality of manipulation instruction units are enlarged in the display screen and arranged along the four corners of the display screen.

2. The trouble diagnosing device according to claim 1, wherein one of the four buttons is configured to instruct adjustment of the control device, and another of the four buttons is configured to instruct a control amount larger than that of the adjustment by the one button.

3. The trouble diagnosing device according to claim 1, wherein the display screen further displays a determination button configured to instruct storage of the control amount of the control device instructed by the plurality of manipulation instruction units to a memory of the electronic control unit as an initial set value.

4. The trouble diagnosing device according to claim 3, wherein when the determination button is pressed, the vehicle height is automatically checked if it is in a specified range before the storage of the vehicle height as the initial set value is determined, and only when the vehicle height is normal, the storage of the vehicle height is determined, whereas when the vehicle height is abnormal, an indication of the abnormality is displayed on the display screen and the determination is withheld.

5. A trouble diagnosing device connectable to an electronic control unit mounted on a vehicle, the trouble diagnosing device comprising:

a display unit including a rectangular display screen;

a plurality of manipulation instruction units displayed on the display unit and configured to instruct operation of a control device controlled by the electronic control unit; and a display enlargement instruction unit displayed on the display unit and configured to instruct enlargement of display of the plurality of manipulation instruction units, wherein when the display enlargement instruction unit is manipulated, the plurality of manipulation instruction units are enlarged in the display along corners of the display unit, and wherein the control device is an air suspension device mounted on the vehicle, and the plurality of manipulation instruction units are vehicle height adjustment buttons configured to adjust the vehicle height of the vehicle by adjusting up-and-down movement of the air suspension device, and the plurality of manipulation instruction units comprise at least:

a first button configured to instruct adjustment of the suspension device in an up direction;

a second button configured to instruct a control amount larger in the up direction than that of the adjustment by the first button;

a third button configured to instruct adjustment of the suspension device in a down direction;

a fourth button configured to instruct a control amount larger in the down direction than that of the adjustment by the third button.

6. The trouble diagnosing device according to claim 5, wherein:

the air suspension device is mounted to four rear wheels comprising a rear front-right wheel, a rear front-left wheel, a rear rear-right wheel, and a rear rear-left wheel, and the display screen displays a switch button configured to switch between a mode of charging and discharging air to and from the air suspension device mounted to each of the four wheels separately and a mode of charging and discharging air to and from the air suspension device mounted to each of the four wheels at a same time.

7. The trouble diagnosing device according to claim 5, wherein when the display enlargement instruction unit displayed on the display unit is manipulated, the first to fourth buttons are enlarged in the display respectively in corners sections created by dividing the rectangular display screen substantially equally into four.

8. The trouble diagnosing device according to claim 7, wherein:

the air suspension device is mounted to four rear wheels comprising a rear front-right wheel, a rear front-left wheel, a rear rear-right wheel, and a rear rear-left wheel, and the display screen displays a switch button configured to switch between a mode of charging and discharging air to and from the air suspension device mounted to each of the four wheels separately and a mode of charging and discharging air to and from the air suspension device mounted to each of the four wheels at a same time.

9. The trouble diagnosing device according to claim 5, wherein:

the control device is an air suspension device mounted to each of front wheels and rear wheels, the plurality of manipulation instruction units comprise manipulation instruction units for adjustment of the vehicle height of the front wheels and the rear wheels, and the display screen displays both of the manipulation instruction units for adjustment of the vehicle height of the front wheels and adjustment of the vehicle height of the rear wheels at a same time on a same display image.

10. The trouble diagnosing device according to claim 9, wherein:

the air suspension device is mounted to four rear wheels comprising a rear front-right wheel, a rear front-left wheel, a rear rear-right wheel, and a rear rear-left wheel, and the display screen displays a switch button configured to switch between a mode of charging and discharging air to and from the air suspension device mounted to each of the four wheels separately and a mode of charging and discharging air to and from the air suspension device mounted to each of the four wheels at a same time.

* * * * *